United States Patent
Cedarleaf et al.

(10) Patent No.: US 12,237,128 B2
(45) Date of Patent: Feb. 25, 2025

(54) CURRENT LOOP TRANSMITTER CIRCUITRY FOR MONITORING A DRY CONTACT SWITCH STATE

(71) Applicant: Cornell Pump Company LLC, Clackamas, OR (US)

(72) Inventors: Jonathan Cedarleaf, Milwaukie, OR (US); Adam Lindeman, Portland, OR (US); Colin O'Callaghan, Portland, OR (US); Aaron Weiss, Portland, OR (US)

(73) Assignee: Cornell Pump Company LLC, Clackamas, OR (US)

( * ) Notice: Subject to any disclaimer, the term of this patent is extended or adjusted under 35 U.S.C. 154(b) by 290 days.

(21) Appl. No.: 18/149,983

(22) Filed: Jan. 4, 2023

(65) Prior Publication Data
US 2023/0215672 A1 Jul. 6, 2023

Related U.S. Application Data

(60) Provisional application No. 63/296,969, filed on Jan. 6, 2022.

(51) Int. Cl.
*H01H 47/00* (2006.01)
*G05B 19/042* (2006.01)
*H04B 1/04* (2006.01)

(52) U.S. Cl.
CPC ....... *H01H 47/001* (2013.01); *G05B 19/0425* (2013.01); *H01H 47/002* (2013.01); *H04B 1/04* (2013.01); *G05B 2219/24215* (2013.01)

(58) Field of Classification Search
CPC ............... H01H 47/001; H01H 47/002; G05B 19/0425; H04B 1/04
See application file for complete search history.

(56) References Cited

U.S. PATENT DOCUMENTS 4,363,030 A * 12/1982 Maltby ................. G08B 29/00
340/511
6,950,851 B2   9/2005 Osburn, III
(Continued)

FOREIGN PATENT DOCUMENTS

| EP | 3014371 A1 | 5/2016 |
| EP | 3582201 A1 | 12/2019 |
| WO | 2014209535 A1 | 12/2014 |

OTHER PUBLICATIONS

Kevin Duke, Collin Wells, Masaharu Takahashi: TI Designs—Precision: Certified Design: 2-wire 4-20mA Transmitter, EMC/EMI Tested Reference Design. Texas Instruments. TIDUAO7—Nov. 2015, 26 pages.

(Continued)

*Primary Examiner* — Jared Fureman
*Assistant Examiner* — Samantha L Faubert
(74) *Attorney, Agent, or Firm* — Snyder, Clark, Lesch & Chung, LLP (57) ABSTRACT

A device includes a device input, an output connector configured to connect to a current loop, and current loop transmitter circuitry. The current loop transmitter circuitry receives, via the device input, an input from a dry contact switch, and translates a state of the dry contact switch to a current loop current. The current loop transmitter circuitry transmits the current loop current via the output connector through the current loop.

20 Claims, 7 Drawing Sheets

(56) References Cited

U.S. PATENT DOCUMENTS

| | | | |
|---|---|---|---|
| 7,079,117 | B2 | 7/2006 | Pratt et al. |
| 7,129,879 | B1 | 10/2006 | Glibbery |
| 7,154,425 | B2 | 12/2006 | Venditti et al. |
| 7,894,460 | B2 | 2/2011 | Carpman et al. |
| 8,219,214 | B1 | 7/2012 | Mimlitz |
| 8,324,885 | B2 | 12/2012 | Dobyns |
| 8,587,461 | B1 | 11/2013 | Mitchell |
| 8,866,659 | B2 | 10/2014 | Stein et al. |
| 10,212,162 | B2 | 2/2019 | Maria |
| 10,637,516 | B2 * | 4/2020 | Saito ............... H04B 1/034 |
| 11,016,457 | B1 | 5/2021 | Gilbert |
| 2009/0196374 | A1 | 8/2009 | Schulte et al. |

OTHER PUBLICATIONS

Burr-Brown Products from Texas Instruments. 4-20mA Current Loop Transmitters. 2000-2003, XTR115., XTR116. SBOS124A—Jan. 2000—Revised Nov. 2003. 16 pages.

PCT International Search Report issued for corresponding international application No. PCT/US2023/010115; mailed Apr. 28, 2023; 10 pages.

\* cited by examiner

FIG. 5

CURRENT LOOP TRANSMITTER CIRCUITRY FOR MONITORING A DRY CONTACT SWITCH STATE

CROSS-REFERENCE TO RELATED APPLICATION

This application claims priority under 35 U.S.C. § 119, based on U.S. Provisional Patent Application No. 63/296,969 filed Jan. 6, 2022, titled "CURRENT LOOP TRANSMITTER CIRCUITRY FOR MONITORING A DRY CONTACT SWITCH STATE," the disclosure of which is hereby incorporated by reference.

BACKGROUND

Within the field of control devices, input devices can take on a variety of forms, such as, for example, switches, sensors, or relays. Input devices may consist of two varieties of contacting methods—referred to as "wet contacts" and "dry contacts." A wet contact involves a switch that automatically supplies a voltage to the device that is connected to the switch. One example of a wet contact is a solid-state switching device (e.g., a proximity sensor, a temperature sensor, an air-flow sensor). A dry contact is a volt-free contact that does not directly supply power from the switch but is instead supplied by another source. A dry contact is typically used to provide electrical isolation. One example of a dry contact includes different types of relays, such as a solid-state relay.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

Current loops are generally used in process control applications for carrying signals to Proportional-Integral-Derivative (PID) controllers, Supervisory Control and Data Acquisition (SCADA) systems, or programmable logic controllers (PLCs). Current loops may, for example, carry sensor information from field instrumentation (e.g., pressure, temperature, or flow sensors) or may carry control signal signals to process modulating devices (e.g., valves). A system employing a current loop may include a sensor, a current transmitter, a current loop wire(s), a power source, and a receiver. The sensor measures a process variable, and the transmitter converts the sensor's measurements into an output current based on the applied power source. The current loop wire(s) carries the transmitter's output current to the receiver, which interprets the current signal to retrieve the original sensor measurement. The receiver may include a PID controller, a SCADA system, or a PLC.

In monitoring, automation, and SCADA systems, analog inputs and digital inputs may be provided in banks, with some number of auxiliary digital and analog inputs pre-designed into the system. In such systems, the number of analog and digital inputs, including auxiliary digital and/or analog inputs, is defined in the design phase and is limited by hardware and/or space considerations. Additional inputs, such as additional digital inputs, for example, may later be needed that exceed the pre-existing number of digital inputs of the system, and adding such additional digital inputs can be costly and time-consuming. For example, a monitoring, automation, or SCADA system may need to monitor the state of numerous dry contact switches (e.g., the open/closed state of numerous relays) involved in a particular process or application and, therefore, needs numerous digital inputs to receive the inputs from each of the dry contact switches. The needed digital inputs may exceed the number of existing digital inputs pre-designed into the bank of digital inputs of the monitoring, automation, or SCADA system. Embodiments described herein provide the ability to re-purpose an existing, unused analog input of a monitoring, automation, or SCADA system as a digital input for receiving a dry contact switch input. This re-purposing requires minimal system downtime or programming to recognize an existing dry contact switch input, as compared to physically installing new digital input hardware and programming the system to recognize the hardware.

To re-purpose an existing, unused analog input of a monitoring, automation, or SCADA system to monitor a state of a dry contact switch, current loop transmitter circuitry, as described herein, may be used to translate a state of the dry contact switch (i.e., switch open or switch closed) into a current loop output current. The output current may be transmitted, via a current loop, to the monitoring, automation, or SCADA system as one of multiple different current levels that represent the state of the dry contact switch. In one implementation described herein, the current loop transmitter circuitry may generate a current loop current in a range of 4-20 milliamps (mA). A current measuring unit, that may be associated with the monitoring, automation, or SCADA system, measures the current level in the current loop, and, in some implementations, interprets those current level measurements as digital highs or lows. For example, a low current level (e.g., approximately 4 mA) in the current loop may represent a digital low and indicate that the dry contact switch is open (i.e., switch off), and a high current level (e.g., approximately 20 mA) in the current loop may represent a digital high and indicate that the dry contact switch is closed (i.e., switch on). Additionally, implementations described herein may include a "fault state" in which zero current transmitted in the current loop represents a failure or fault associated with the dry contact switch input and/or with the current loop transmitter circuitry.

Figure 1:
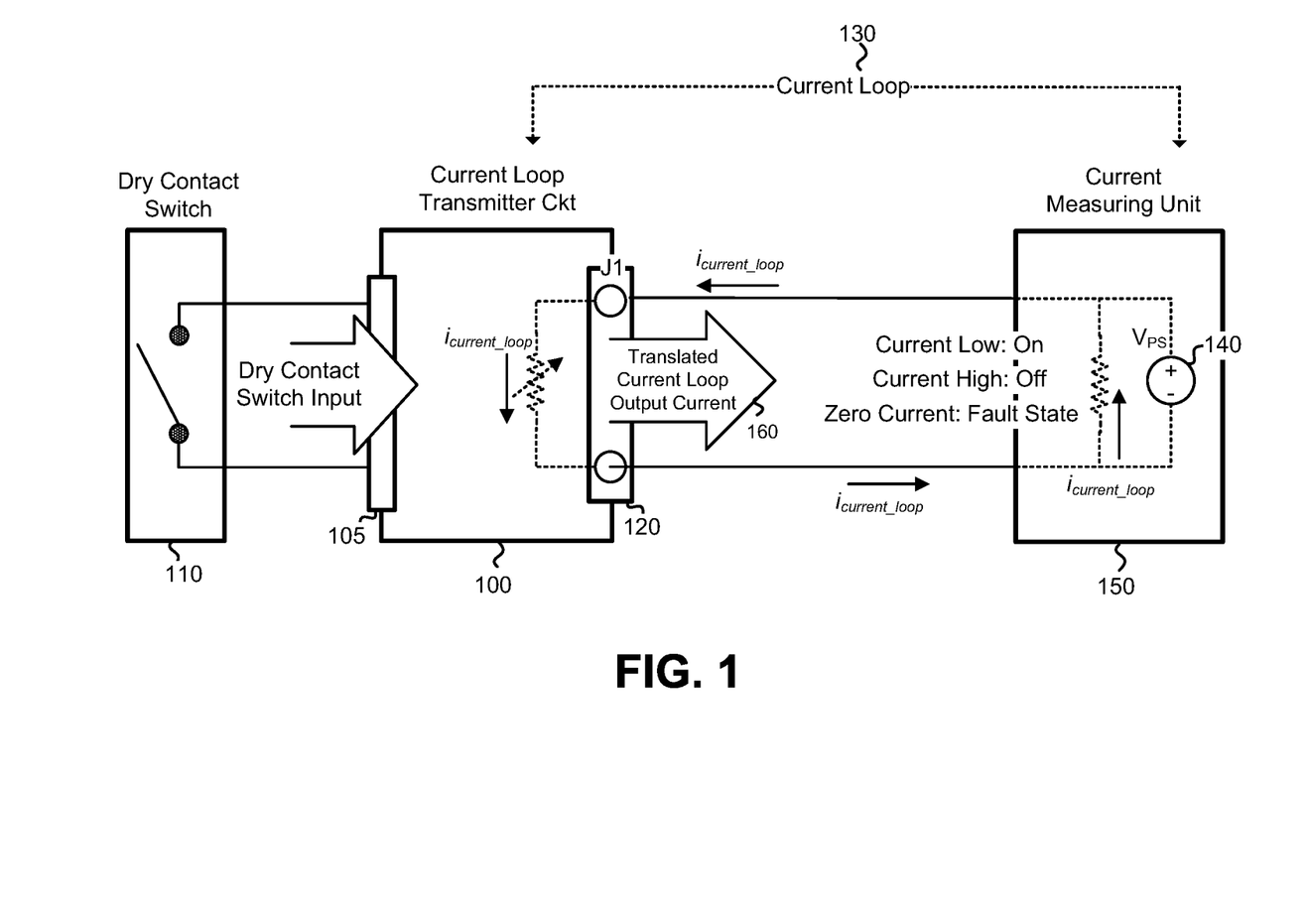
FIG. 1 depicts current loop transmitter circuitry, according to one example embodiment, that translates a state of a dry contact switch input to a current loop output current.

FIG. 1 depicts current loop transmitter circuitry 100, according to one example embodiment, that translates a state of an input dry contact switch to a current loop output current. As shown, current loop transmitter circuitry 100 includes an input 105 that connects to a dry contact switch 110 and outputs a translated current output current 160, via a connector (J1) 120, to a current loop 130 based on a current state (e.g., switch open, switch closed) of the dry contact switch 110. Connector 120 includes an input terminal that connects to a first conductive wire of current loop 130 and an output terminal that connects to a second conductive wire of current loop 130. A current measuring unit 150 may be connected in series with the current loop 130 such that the current of the current loop 130 flows through the current measuring unit 140. A Direct Current (DC) power supply voltage ($V_{PS}$) 140 may be connected in parallel with the current loop 130. In one implementation, as shown in FIG. 1, $V_{PS}$ 140 may be a component of current measuring unit 150 and is connected internally, within unit 150, with current loop 130. In another implementation, not shown in FIG. 1, $V_{PS}$ 140 may be connected in parallel with current loop 130 as a component that is external to current measuring unit 150.

The current loop transmitter circuitry 100, as described in further detail below, effectively adjusts it internal resistance, as seen by the external current loop 130, based upon the state of the dry contact switch 110. Thus, when the dry contact switch 110 is in an open state (i.e., switch off), the current loop transmitter circuitry 100 effectively decreases its internal resistance such that an increased level of current (e.g., a high current level) flows from $V_{PS}$ 140 through the current loop 130 and through circuitry 100. When the dry contact switch 110 is in a closed state (i.e., switch on), the current loop transmitter circuitry 100 effectively increases its internal resistance such that a decreased level of current (e.g., a low current level) flows from $V_{PS}$ 140 through the current loop 130 and through the circuitry 100.

Current loop transmitter circuitry 100 may include a current transmitter Integrated Circuit (IC), in addition to other components on an input side of the circuitry 100 and on a current loop output side of the circuitry 100. The current transmitter IC may be selected from one of multiple different models of existing current transmitter ICs. In one implementation, described below with respect to FIGS. 3A and 3B, current loop transmitter circuitry 100 may include a Texas Instruments (TI) XTR115 or XTR116 4-20 mA Current Loop Transmitter Integrated Circuit (IC). Other types and/or models of current loop transmitters may, however, be used in circuitry 100. In some implementations, input 105, current loop transmitter circuitry 100 and connector J1 120 may be components of a single device (i.e., contained within a single device housing). In a further implementation, input 105, current loop transmitter circuitry 100, connector J1 120, $V_{PS}$ 140, and current measuring unit 150 may be components of a single system. In yet another implementation, current loop transmitter circuitry 100, connector J1 120, and $V_{PS}$ 140 may be components of a single system, and current measuring unit 150 may be a component of an external device or system (e.g., current measuring unit 150 may be a component of monitoring, automation, or SCADA system 200).

Figure 2A:
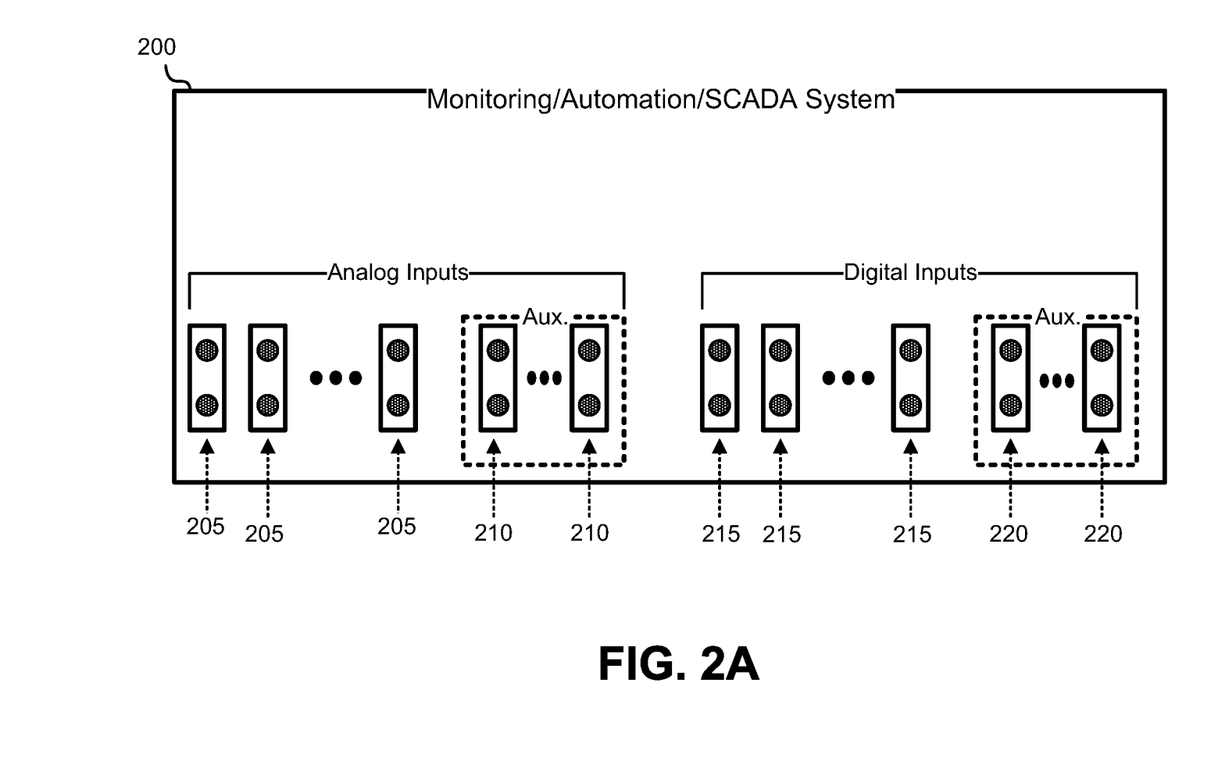
FIG. 2A depicts a monitoring, automation, or Supervisory Control and Data Acquisition (SCADA) system with which the current loop transmitter circuitry of FIG. 1 may be used for translating a dry contact switch input to a current loop output current level.

FIG. 2A depicts a monitoring, automation, or SCADA system 200 with which the current loop transmitter circuitry 100 described herein may be used for translating dry contact switch inputs to current loop current levels. System 200 may include any type of monitoring, automation, or SCADA system that monitors a state of at least one dry contact switch (e.g., the open/closed state of a relay), and may monitor the state of numerous dry contact switches simultaneously. As shown, system 200 may include a bank of analog inputs 205 and a set of auxiliary analog inputs 210, and a bank of digital inputs 215 and a set of auxiliary digital inputs 220. The analog inputs of the bank of analog inputs 205 may each receive an analog input signal from an analog source (not shown). For example, the analog inputs 205 may each receive an analog input signal from a respective temperature, pressure, flow rate, or humidity sensor. The digital inputs of the bank of digital inputs 215 may each receive a digital input signal from a digital source (not shown). For example, the digital inputs 215 may each receive a digital input signal from a respective flow switch, level switch, pressure switch, or proximity switch.

Figure 2B:
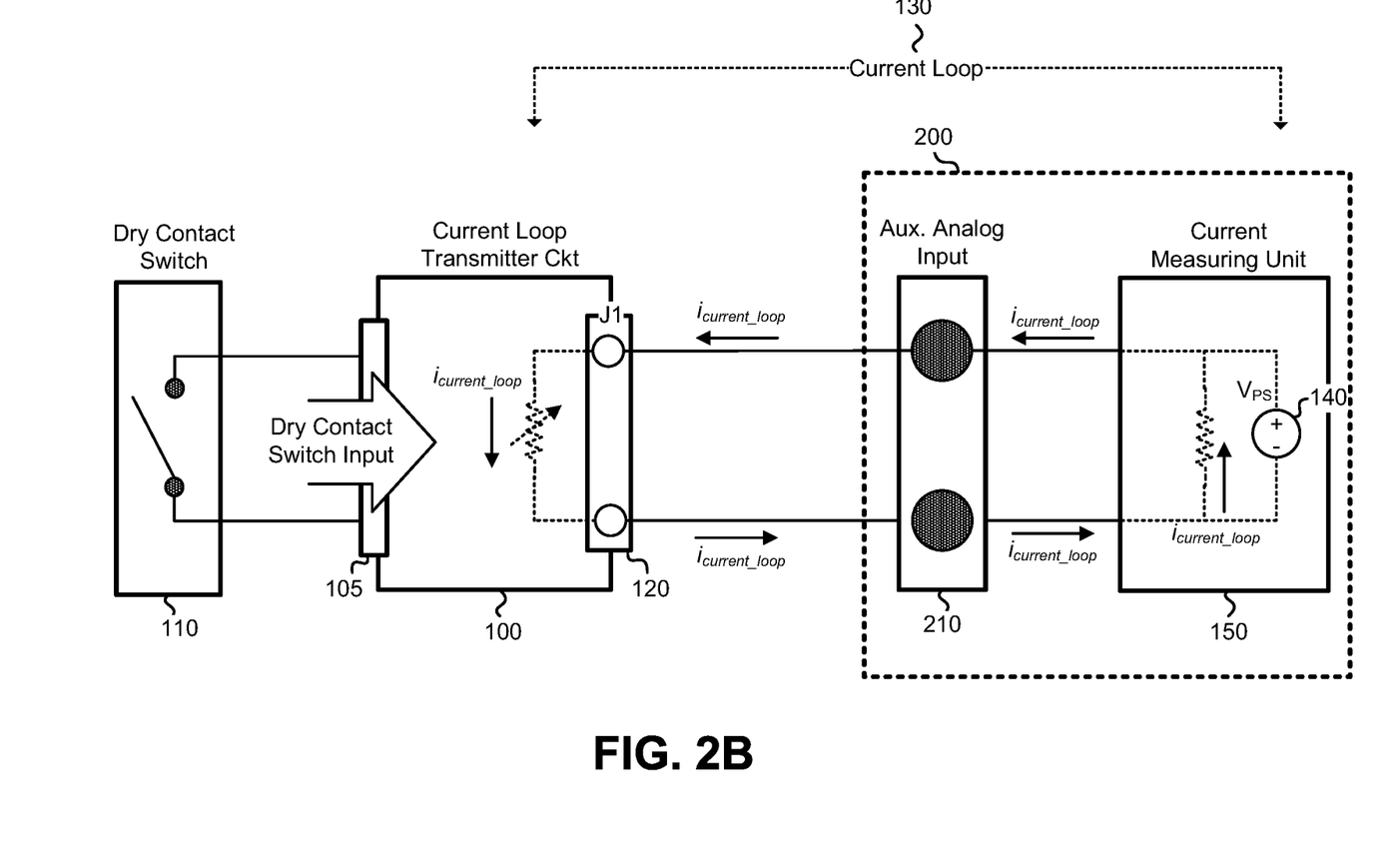
FIG. 2B depicts an example of the use of the current loop transmitter circuitry of FIG. 1 to convert an analog input of a monitoring, automation, or SCADA system into a digital input.

FIG. 2B depicts an example of the use of current loop transmitter circuitry 100 to convert an analog input of monitoring, automation, or SCADA system 200 (e.g., an auxiliary analog input 210 of FIG. 2B) into a digital input for purposes of receiving a digital signal from a dry contact switch. As shown, the dry contact switch 110 connects to input 105 of current loop transmitter circuitry 100, and the current loop input and output terminals of connector J1 120 connect to wires of the current loop 130. $V_{PS}$ 140 connects in parallel with current loop 130 such that it is also parallel-connected across the input and output terminals of connector J1 120 and across the input and output terminals of analog input 210 of system 200. The output terminal of connector J1 120 connects in series, via a first current loop wire, with an input terminal of analog input 210 of system 200, and an input terminal of connector J1 120 connects in series, via a second current loop wire, with an output terminal of analog input 210 of system 200. Current measuring unit 150, shown as a component of system 200 in the example of FIG. 2B, completes the current loop with a connection across the terminals of analog input 210. In other implementations, such as shown in FIG. 1, current measuring unit 105 may be a component that is separate from, and external to, system 200. $V_{PS}$ 140 is shown in FIG. 2B as a component of current measuring unit 150 that is connected with parallel with current loop 130. In another implementation (not shown), $V_{PS}$ 140 may be connected in parallel with current loop 130 as a component that is external to current measuring unit 150 and/or external to system 200.

Current loop transmitter circuitry 100 effectively varies its internal resistance, based on a state of the dry contact switch 110 connected to input 105, to generate, in conjunction with the voltage applied by $V_{PS}$ 140, the current loop output current (current loop). The current loop output current flows, in the example depicted in FIG. 2B, counterclockwise from a positive (+) terminal of $V_{PS}$ 140 through a first terminal of analog input 210, via a first wire of current loop 130, through a first terminal of connector J1 120, through current loop transmitter circuitry 100, out a second terminal of connector J1 120, via a second wire of current loop 130, into a second terminal of analog input 210, and through current measuring unit 150 to return to the negative (−) terminal of $V_{PS}$ 140.

Figure 3A:
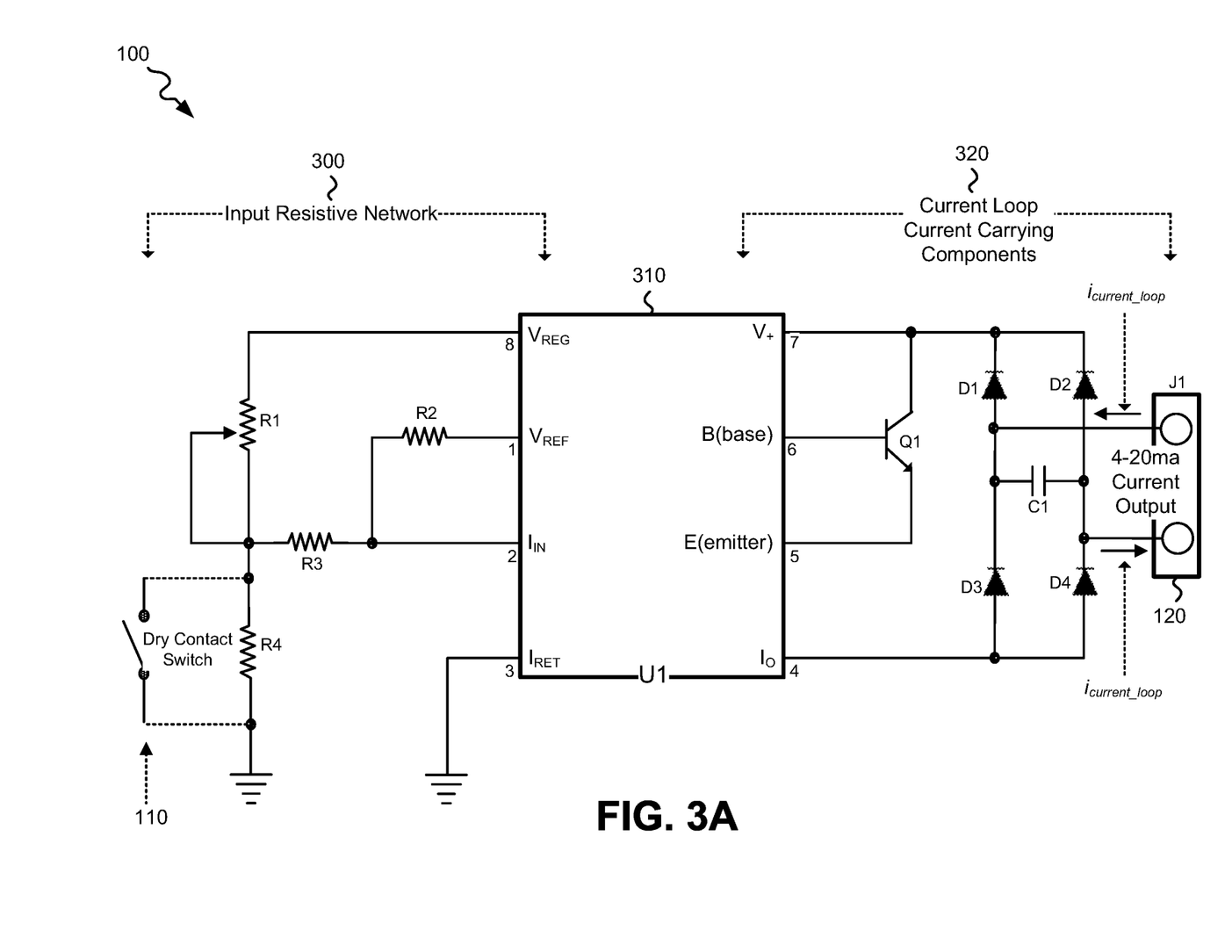
FIGS. 3A and 3B illustrate an exemplary implementation of the current loop transmitter circuitry of FIG. 1 in which the circuitry includes a particular current loop transmitter Integrated Circuit.

FIG. 3A illustrates an exemplary implementation of the current loop transmitter circuitry 100 of FIG. 1 in which circuitry 100 includes a XTR115 4-20 mA Current Loop Transmitter IC (shown as "U1"). The circuitry 100, in the exemplary implementation of FIG. 3A, includes an input resistive network 300, U1 310, and current loop current carrying components 320. Input resistive network 300 includes a network of resistors R1-R4 that connect to various pins of IC U1 and establish the input current to U1 310 that changes depending upon the state of the dry contact switch 110 (e.g., switch open, or switch closed). Current loop current carrying components 320 include a transistor Q1, diodes D1-D4, a capacitor C1, and connector J1 120 that carry the output current which flows through the current loop (not shown) that connects to J1 120. The dry contact switch 110 connects, in parallel, across resistor R4 in the input resistive network 300. The resistive value to which variable resistor R1 is currently tuned to set the highvalue current for the current loop current when the dry contact switch in the open, or OFF, state. Therefore, when variable resistor R1 is tuned to its highest resistance, and the dry contact switch 110 is in an OFF state, the current loop current that flows through the current loop current carrying components 320 will be at a lowest "high" current loop current level. When the variable resistor R1 is tuned to its lowest resistance, and the dry contact switch 110 is in an OFF state, the current loop current that flows through the current loop current carrying components 320 will be at a highest "high" current loop current level.

As shown in FIG. 3A, U1 includes 4 pins that connect to components in the input resistive network 300 of circuitry 100: pin 1 ($V_{REF}$), pin 2 ($I_{IN}$), pin 3 ($I_{RET}$), and pin 8 ($V_{REG}$). A top of variable resistor R1 connects to pin 8 ($V_{REG}$) of U1 and the bottom of R1 connects to a top of R4 and to one side of R3. The other side of R3 connects to one side of resistor R2, and the other side of R2 connects to pin 1 ($V_{REF}$) of U1. Pin 3 ($I_{RET}$) of U1, and a bottom of R4, both connect to ground.

As further shown in FIG. 3A, U1 includes another 4 pins that connect to components in the current loop current carrying components 320 of circuitry 100: pin 4 ($I_O$), pin 5 (E(emitter)), pin 6 (B(base)), and pin 7 ($V_+$). The collector of Q1 connects to pin 7 of U1 310 and to the cathodes of D1 and D2. The base of Q1 connects to pin 6 (base), and the emitter of Q1 connects to pin 5 (emitter) of U1 310. Pin 4 of U1 310 connects to the anodes of D3 and D4. The anode of D1 connects to the cathode of D3, and to a first side of capacitor C1. The anode of D2 connects to the cathode of D4 and to a second side of capacitor C2. One terminal of connector J1 120 connects to an anode of D1, a cathode of D3, and to the first side of capacitor C1, and the other terminal of connector J1 120 connects to an anode of D2, a cathode of D4, and to the second side of capacitor C1.

Figure 3B:
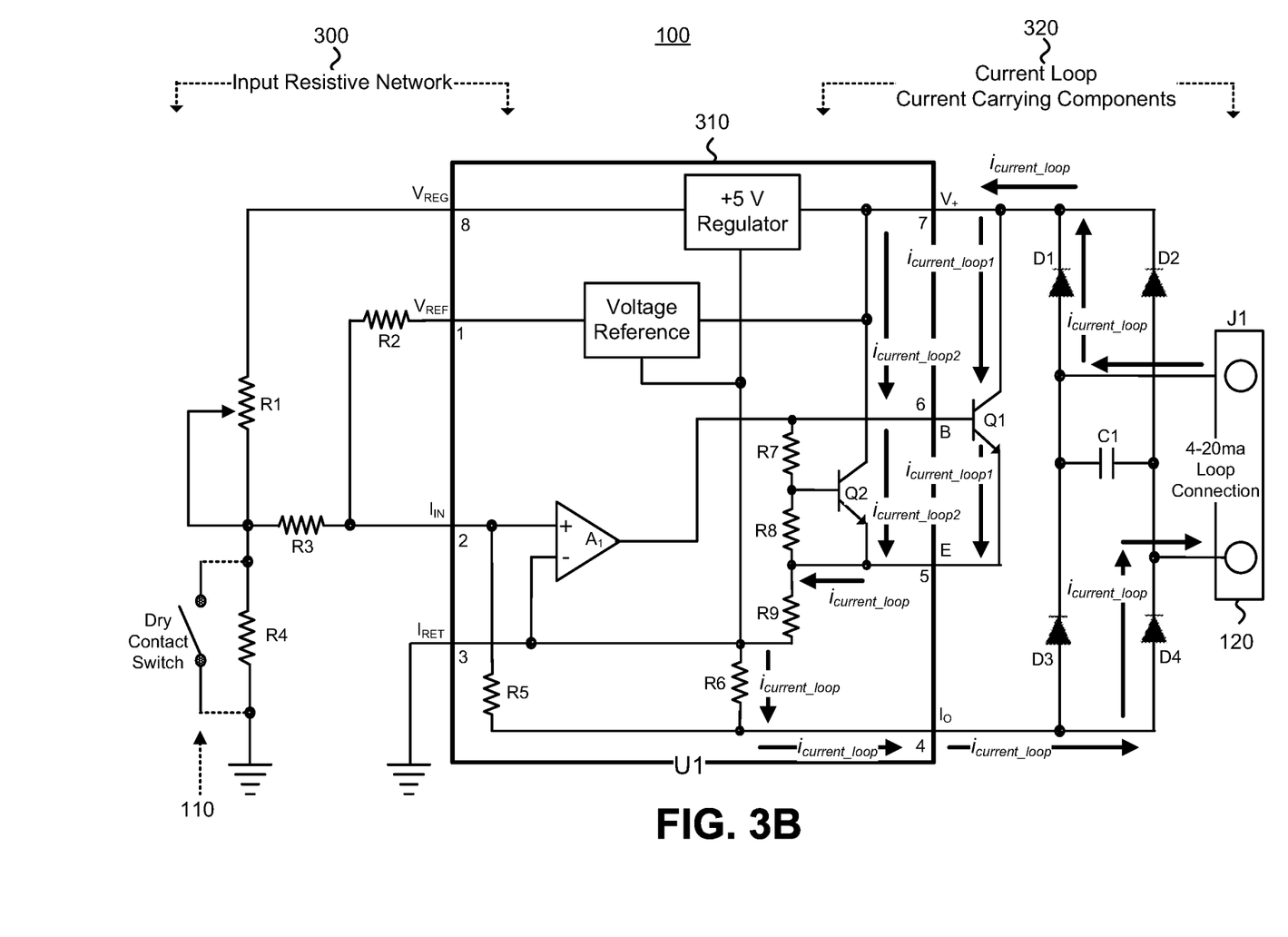

FIG. 3B depicts, at a high-level, the operation of the current loop transmitter circuitry 100 of FIG. 3A, including the involvement of the internal components of U1 310 in transmitting the current loop current via current loop 130. The internal components of U1 310 are shown to illustrate the operation of the XTR115 4-20 mA Current Loop Transmitter U1 310 within circuitry 100. One skilled in the art will recognize, however, that substitution of U1 310 with a different model or type of current loop transmitter may change the configuration of the internal components of U1, and may also cause a modification in the components, and arrangement of the components, of input resistive network 300, and the current loop current carrying components 320 of circuitry 100.

When dry contact switch 110 is placed in an open state (alternatively referred to herein as an OFF state), as shown in FIG. 3B, an increased current (and a corresponding increased voltage) is applied, via resistor R3 and pin 2 (TIN), to the positive (+) input of the operation amplifier (op amp) A1. An increased voltage at the positive (+) input of A1, in turn, causes an increased voltage to be output from A1, thereby increasing the bias voltage to the base of Q1 and the base of Q2. Increasing the bias voltage to the base of Q1 and Q2 turns on Q1 and Q2, effectively decreasing the internal resistance of circuitry 100, as seen from the external current loop 130, such that an increased level of current flows through Q1 (shown as $i_{current\_loop1}$) and Q2 (shown as $i_{current\_loop2}$). Since the overall current loop current $i_{current\_loop}$ is approximately equal to $i_{current\_loop1}$ plus $i_{current\_loop2}$ (i.e., $i_{current\_loop} \approx i_{current\_loop1} + i_{current\_loop2}$), then increasing the bias voltage to the base of Q1 and Q2 increases the current loop current $i_{current\_loop}$ flowing out of connector J1 120 and into the current loop 130 (not shown in FIG. 3B).

When dry contact switch 110 is placed into a closed state (alternatively referred to herein as an ON state)(not shown in FIG. 3B), a decreased current (and a corresponding decreased voltage) is applied, via resistor R3 and pin 2 ($I_{IN}$), to the positive (+) input of the operational amplifier (op amp) A1. A decreased voltage at the positive (+) input of A1, in turn, causes a decreased voltage to be output from A1, thereby decreasing the bias voltage to the base of Q1 and the base of Q2. Decreasing the bias voltage to the base of Q1 and Q2 turns off Q1 and Q2, effectively increasing the internal resistance of circuitry 100, as seen from the external current loop 130, such that a decreased level of current flows through Q1 (shown as $i_{current\_loop1}$) and Q2 (shown as $i_{current\_loop2}$). Since $i_{current\_loop} \approx i_{current\_loop1} + i_{current\_loop2}$, then decreasing the bias voltage to the bases of Q1 and Q2 decreases the current loop current $i_{current\_loop}$ flowing out of connector J1 120 and into the current loop 130 (not shown).

FIG. 3B further depicts the flow of the current loop current $i_{current\_loop}$ through the current loop current carrying components 320 of circuitry 100. As shown, due to the applied voltage of power supply $V_{PS}$ 140 (not shown in FIG. 3B), the current loop current flows from the current loop 130 (not shown) in through a first terminal of connector J1 120 and through forward-biased diode D1. The current loop current then flows through, and is divided among, a first circuit branch that includes transistor Q1 and a second circuit branch that includes transistor Q2. A small portion of the current loop current is also supplied to the +5 V regulator of U1. The current loop current recombines, after flowing through the first circuit branch that includes Q1 and through the second circuit branch that includes Q2, to flow through resistors R9 and R6. After flowing through resistors R9 and R6, the current loop current $i_{current\_loop}$ flows through forward-biased diode D4 and out a second terminal of connector J1 120 into the current loop 130 (not shown). Multiple different levels of the current loop current $i_{current\_loop}$ may flow through current loop current carrying components 320 based on the state of dry contact switch 110. For example, the current loop current $i_{current\_loop}$ may flow at a low level (e.g., 4 mA) when dry contact switch 110 is in a closed state (i.e., switch=ON). As another example, the current loop current $i_{current\_loop}$ may flow at a high level (e.g., 20 mA) when dry contact switch 110 is in an open state (i.e., switch=OFF), where the high current level is set by adjustment of variable resistor R1 in the input resistive network 300 of circuitry 100.

Figure 4:
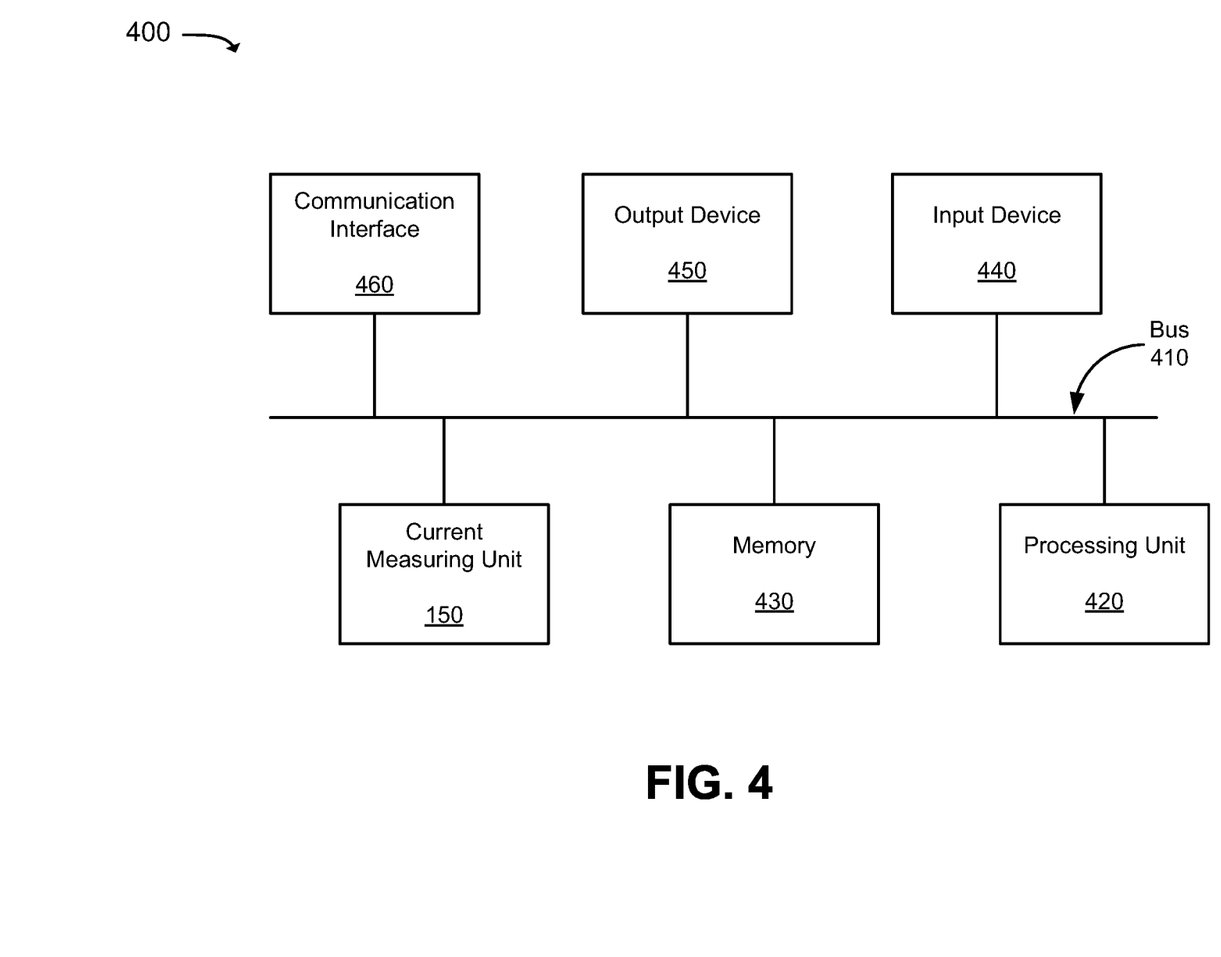
FIG. 4 is a diagram that depicts exemplary components of a controller device.

FIG. 4 is a diagram that depicts exemplary components of a controller device 400 (referred to herein as "controller 400"). In some implementations, controller device 400 may be a component of monitoring, automation, or SCADA system 200. In other implementations, controller device 400 may be a stand-alone device that includes current measuring unit 150. In further implementations, current measuring unit 150 may be a stand-alone device, or a device within a larger system, that may include the components of controller device 400 shown in FIG. 4.

Controller 400 may include a bus 410, a processing unit 420, a memory 430, an input device 440, an output device 450, a communication interface 460, and current measuring unit 150. Bus 410 may include a path that permits communication among the components of controller 400. Processing unit 420 may include one or more processors or microprocessors which may interpret and execute instructions, or processing logic. Memory 430 may include one or more memory devices for storing data and instructions. Memory 430 may include a random access memory (RAM) or another type of dynamic storage device that may store information and instructions for execution by processing unit 420, a Read Only Memory (ROM) device or another type of static storage device that may store static information and instructions for use by processing unit 420, and/or a magnetic, optical, or flash memory recording and storage medium. The memory devices of memory 430 may each be referred to herein as a "tangible non-transitory computer-readable medium," "non-transitory computer-readable medium," or "non-transitory storage medium." In some implementations, the processes/methods set forth herein can be implemented as instructions that are stored in memory 430 for execution by processing unit 420.

Input device 440 may include one or more mechanisms that permit an operator to input information into controller 400, such as, for example, a keypad or a keyboard, a display with a touch sensitive panel, voice recognition and/or biometric mechanisms, etc. Output device 450 may include one or more mechanisms that output information to the operator, including a display, a speaker, etc. Input device 440 and output device 450 may, in some implementations, be implemented as a user interface (UI) that displays UI information and which receives user input via the UI. Communication interface 460 may include a transceiver(s) that enables controller 400 to communicate with other devices and/or systems. For example, communication interface 460 may include one or more wired and/or wireless transceivers.

Current measuring unit 150 may include any type of circuitry that can measure a current level flowing in current loop 130. Current measuring unit 150 may include, for example, DC ammeter circuitry that connects in series with current loop 130 and measures the current flowing within current loop 130.

The configuration of components of controller 400 illustrated in FIG. 4 is for illustrative purposes. Other configurations may be implemented. Therefore, controller 400 may include additional, fewer, and/or different components, that may be arranged in a different configuration, than depicted in FIG. 4.

Figure 5:
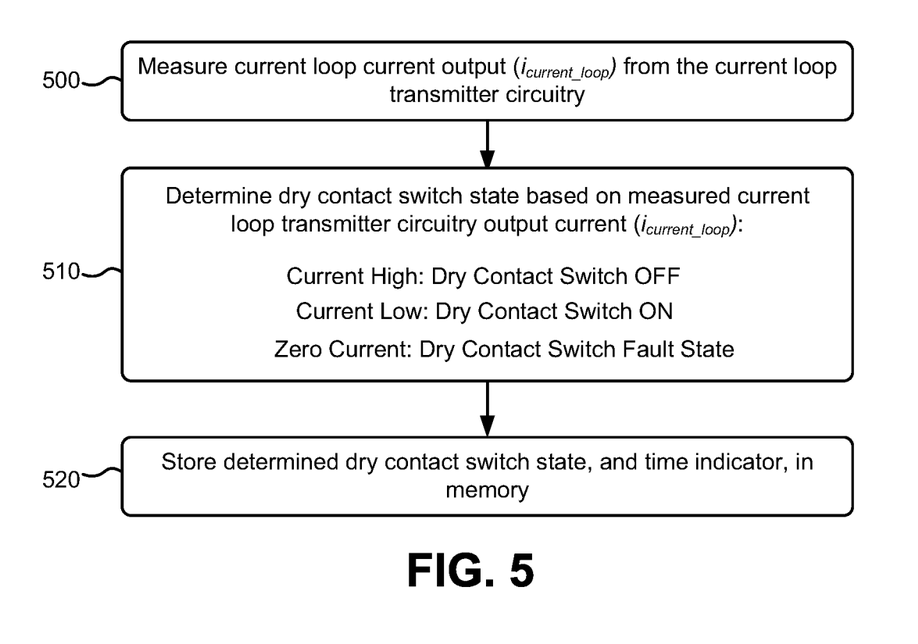
FIG. 5 is a flow diagram of an example process for determining a state of a dry contact switch based on a measurement of current loop current transmitted by current loop transmitter circuitry.

FIG. 5 is a flow diagram of an example process for determining a state of a dry contact switch based on a measurement of current loop current transmitted by current loop transmitter circuitry 100. The exemplary process of FIG. 5 may be implemented by current measuring unit 150 and/or controller 400, in conjunction with current loop transmitter circuitry 100 and $V_{PS}$ 140, such as is shown in FIGS. 1, 2B, 3A, and/or 3B (and described above).

The example process includes current measuring unit 150 measuring the current loop current output ($i_{current\_loop}$) from the current loop transmitter circuitry 100 (block 500). Referring to FIG. 1, or FIG. 2B, current measuring unit 150 may receive the current ($i_{current\_loop}$), flowing through the current loop 130, that is transmitted by circuitry 100 based on the voltage applied by $V_{PS}$ 140.

The current measuring unit 150, and/or controller 400, determines a dry contact switch state based on the measured current loop transmitter circuitry output current $i_{current\_loop}$ (block 510). Current measuring unit 150, and/or controller 400, compares the current measurement obtained in block 500 with current threshold levels to determine the state of the dry contact switch 110. For example, if the measurement of $i_{current\_loop}$ satisfies the condition: low_current$_1 \le i_{current\_loop} \le$ low_currrent$_2$, then the dry contact switch 110 may be determined to be in a closed (or ON) state. In one specific example, this condition may be the following: 4 mA$\le i_{current\_loop} \le$5 mA. As another example, if the measurement of current loop satisfies the condition: high_current$_1 \le i_{current\_loop} \le$ high_current$_2$, then the dry contact switch 110 may be determined to be in an open (or OFF) state. In one specific example, this condition may be the following: 19 mA$\le i_{current\_loop} \le$20 mA. As yet a further example, if the measurement of $i_{current\_loop}$ satisfies the condition: $i_{current\_loop}$=0 mA, then the dry contact switch 110, circuitry 100, and/or system 200, may be determined to be in a fault state.

The current measuring unit 150, and/or controller 400, stores the determined dry contact switch state, and a time indicator, in memory (block 520). Current measuring unit 150, and/or controller 400, obtains a time indicator, such as a clock time maintained by processing unit 420, and stores the dry contact switch state (e.g., open, closed, or fault) and the time indicator in, for example, memory 430. The memory may, for example, store a data structure that maintains a log, over time, of dry contact switch states (e.g., for system 200).

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 5, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 420) of a device. A non-transitory storage medium includes one or more of the storage mediums described in relation to memory 430. The non-transitory computer-readable storage medium may be implemented in a centralized, distributed, or logical division that may include a single physical memory device or multiple physical memory devices spread across one or multiple network devices.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
   a device input;
   an output connector configured to connect to a current loop; and
   current loop transmitter circuitry configured to:
      receive, via the device input, an input from a dry contact switch,
      translate a state of the dry contact switch to a current loop current, and
      transmit the current loop current via the output connector through the current loop.

2. The device of claim 1, wherein the current loop transmitter circuitry comprises:
   a resistive network that receives the input from the dry contact switch; and
   current loop components that connect, via the output connector, in series with the current loop to carry the current loop current to and from the current loop.

3. The device of claim 2, wherein the current loop transmitter circuitry comprises:
   a current loop transmitter Integrated Circuit (IC) that, in conjunction with the resistive network and the current loop components, translates the state of the dry contact switch to the current loop current.

4. The device of claim 1, wherein, when translating the state of the dry contact switch to a current loop current, the current loop transmitter circuitry is configured to:
   adjust an effective internal resistance of the current loop transmitter circuitry to increase or decrease the current loop current based on the state of the dry contact switch.

5. The device of claim 1, wherein the current loop connects in parallel with a voltage source.

6. The device of claim 1, wherein the state of the dry contact switch comprises one of an open state or a closed state.

7. The device of claim 6, wherein the current loop transmitter circuitry, when translating the state of the dry contact switch to the current loop current, is further configured to:
   translate an open state of the dry contact switch to a high current loop current, and
   translate a closed state of the dry contact switch to a low current loop current.

8. The device of claim 1, wherein the state of the dry contact switch comprises one of an open state, a closed state, or a fault state, and wherein the current loop transmitter circuitry, when translating the state of the dry contact switch to the current loop current, is further configured to:
   translate an open state of the dry contact switch to a high current loop current,
   translate a closed state of the dry contact switch to a low, but non-zero, current loop current, and
   translate a fault state of the dry contact switch to a zero current loop current.

9. A system, comprising:
   a current loop;
   current loop transmitter circuitry having an input configured to connect to a dry contact switch and an output configured to connect to the current loop, wherein the current loop transmitter circuitry translates a state of the dry contact switch to a current loop current having one of multiple current levels for transmission via the current loop; and
   a current measuring unit connected in series with the current loop and configured to measure the one of the multiple current levels of the current loop current transmitted over the current loop and determine the state of the dry contact switch based on the measured one of the multiple current levels.

10. The system of claim 9, wherein the state of the dry contact switch comprises an open state, a closed state, or a fault state and wherein, when translating the state of the dry contact switch to the one of the multiple current levels, the current loop transmitter circuitry is configured to:
    translate the open state of the dry contact switch to a high current level,
    translate the closed state of the dry contact switch to a low, but non-zero, current level, and
    translate the fault state of the dry contact switch to a zero current level.

11. The system of claim 9, wherein, when determining the state of the dry contact switch, the current measuring unit is configured to:
    determine that the dry contact switch is in an open state when the one of the multiple current levels is measured as a high current level,
    determine that the dry contact switch is in a closed state when the one of the multiple current levels is measured as a low, but non-zero, current level, and
    determine that the dry contact switch is in a fault state when the one of the multiple current levels is measured as a zero current level.

12. The system of claim 9, wherein the current loop transmitter circuitry comprises:
    a resistive network that receives an input from the dry contact switch; and
    current loop components that connect, via the output, in series with the current loop to carry the current loop current to and from the current loop.

13. The system of claim 12, wherein the current loop transmitter circuitry further comprises:
    a current loop transmitter Integrated Circuit (IC) that, in conjunction with the resistive network and the current loop components, translates the state of the dry contact switch to the one of the multiple current levels for transmission via the current loop.

14. The system of claim 9, wherein, when translating the state of the dry contact switch to the one of the multiple current levels, the current loop transmitter circuitry adjusts an effective internal resistance of the current loop transmitter circuitry to increase or decrease the current loop current transmitted over the current loop based on the state of the dry contact switch.

15. The system of claim 9, wherein the current loop connects in parallel with a voltage source.

16. The system of claim 9, wherein the state of the dry contact switch comprises an open state, or a closed state, and wherein, when translating the state of the dry contact switch to the one of the multiple current levels, the current loop transmitter circuitry is configured to:
translate the open state of the dry contact switch to a high current level of the multiple current levels, and
translate the closed state of the dry contact switch to a low current level of the multiple current levels.

17. A method, comprising:
receiving, by current loop transmitter circuitry, an input from a dry contact switch;
translating, by the current loop transmitter circuitry, a state of the dry contact switch to one of multiple current levels;
transmitting, by the current loop transmitter circuitry, a current loop current, at the one of the multiple current levels, via a current loop;
measuring, by a current measuring unit, the current loop current flowing in the current loop to identify the one of the multiple current levels; and
determining, by the current measuring unit, the state of the dry contact switch based on the identified one of the multiple current levels.

18. The method of claim 17, wherein translating the state of the dry contact switch to one of multiple current levels comprises:
adjusting an effective internal resistance of the current loop transmitter circuitry to increase or decrease the current loop current based on the state of the dry contact switch.

19. The method of claim 17, wherein the multiple current levels comprise a zero current level, a low, but non-zero, current level, and a high current level and wherein determining the state of the dry contact switch further comprises:
determining that the state of the dry contact switch comprises a closed state when the identified one of the multiple current levels comprises the low, but non-zero, current level;
determining that the state of the dry contact switch comprises an open state when the identified one of the multiple current levels comprises the high current level; and
determining that the state of the dry contact switch comprises a fault state when the identified one of the multiple current levels comprises the zero current level.

20. The method of claim 17, wherein the multiple current levels comprise a low current level and a high current level and wherein determining the state of the dry contact switch further comprises:
determining that the state of the dry contact switch comprises a closed, or ON, state when the identified one of the multiple current levels comprises the low current level; and
determining that the state of the dry contact switch comprises an open state when the identified one of the multiple current levels comprises the high current level.

* * * * *